United States Patent Office 3,345,957
Patented Oct. 10, 1967

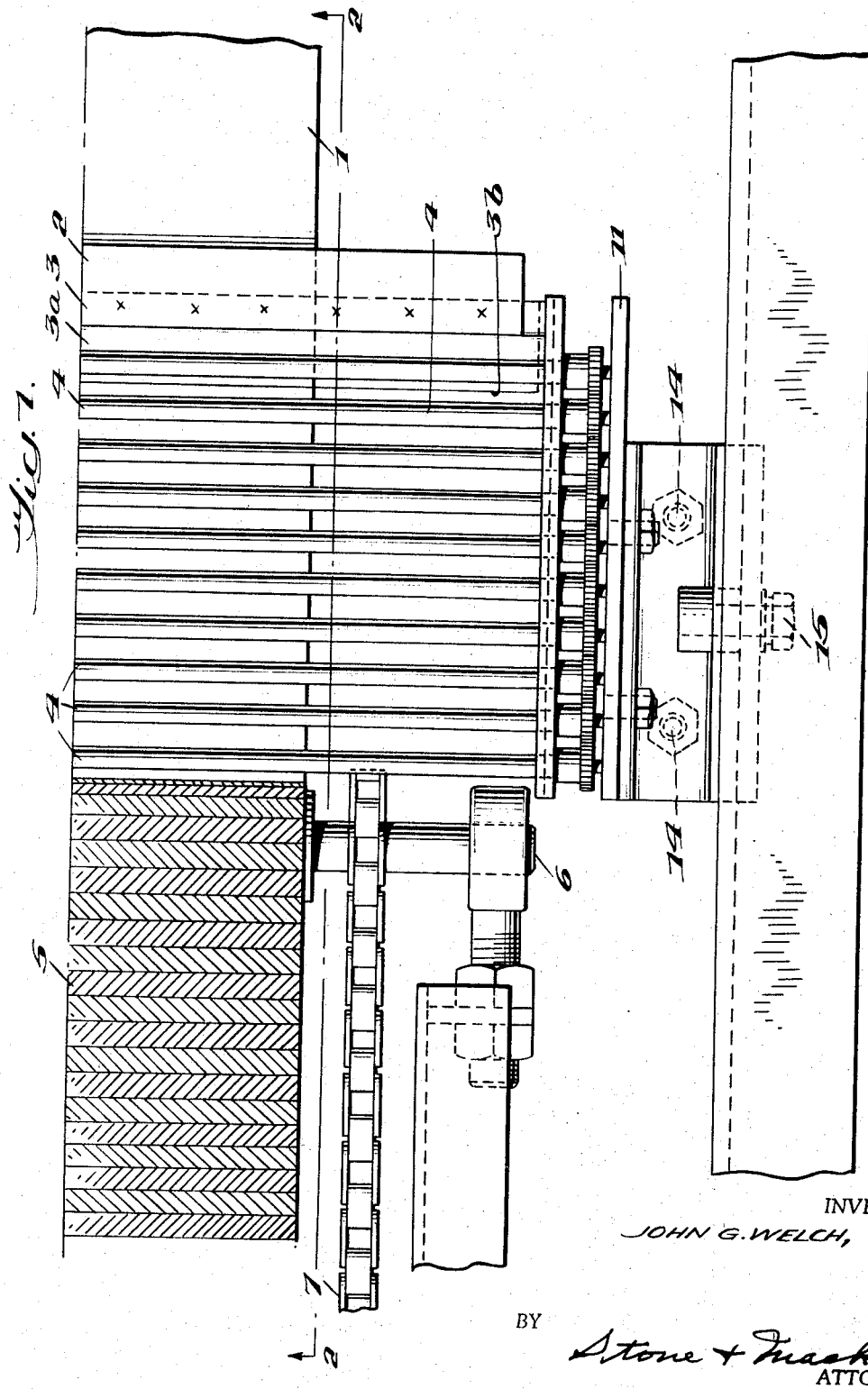

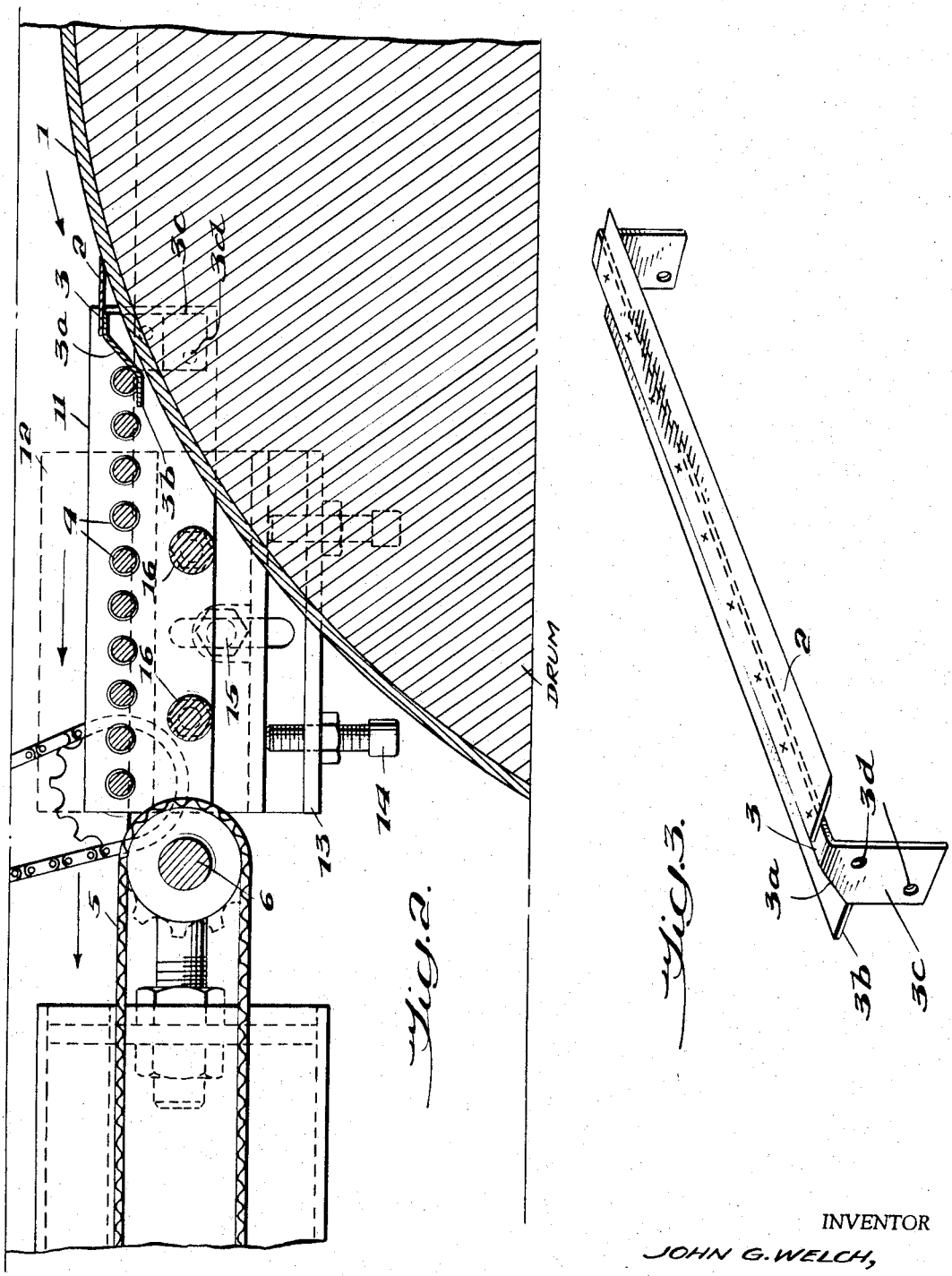

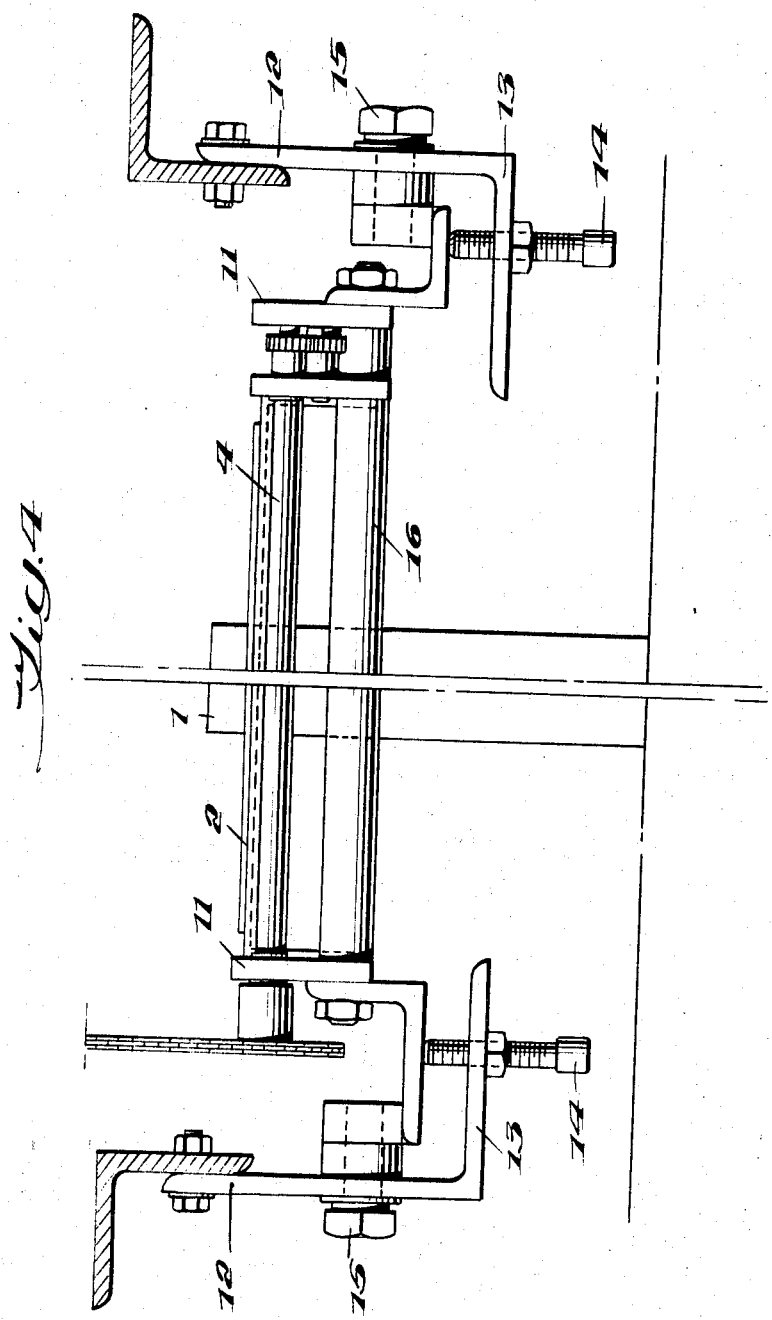

3,345,957
STRIPPING MECHANISM FOR BAKING COOKIES
John G. Welch, Thunderwood Farm,
Lewisville, N.C. 27023
Filed Mar. 15, 1965, Ser. No. 439,856
10 Claims. (Cl. 107—57)

This invention relates to the art of baking products such as cookies in large number in a tunnel-like oven. In such equipment an endless conveyor is used and a large portion of the conveyor is a steel band on which cookie batter is dropped and on which the batter remains until cooking is complete and the cookie is cooled and removed for packaging.

Heretofore it has been customary to bake cookies and after baking the cookies have been racked and cooled on the pans for about fifteen minutes before they were in condition to be handled. After the cooling time, the cookies were then stripped off from the pans by hand with a spatula.

According to this improvement, the cookie products are stripped from a steel band on which the cookie batter is dropped and on which the batter remains until ready to be stripped. The stripping is accomplished by means of a knife which extends across the width of the steel band on which the cookie material is cooked. In dealing with oatmeal cookies, which have a very high sugar content, the cookie is rather molten as it emerges from the discharge end of the oven. In fact it is so extremely molten that a standard stripping knife cannot be used because the cookie must be pushed across the knife by the one following. This causes the molten cookie to curl up on the standard knife assembly as the unstripped cookie presses against the one adhering to the blade. The complete workability of the stripping knife of this improvement, and any other high sugar oatmeal production, is predicated on the success of the stripping knife, that is the success of the product depends on whether or not the product can be indexed, creamed, sandwiched, wrapped, cartoned, or otherwise packaged. The test for satisfactorily handling such cookies is that a cookie which is out of round, or egg shaped, cannot be machine handled or packaged.

In accordance with the foregoing considerations, one such operation involves the preparation of oatmeal and sugar cooking batter which is dropped on a steel belt about 39.4 inches wide, there being ten such droppings across the width of the belt. The problem is therefore how to strip the cookies while still hot so as to avoid damage to the cookies. One of the features of this improvement relates to the stripping knife or blade and manner in which it is mounted with relation to the steel band on which the cookie batter has been dropped and on which the cookies have been cooked.

Another feature relates to the depositing of freshly cooked cookies as they are removed from the band and placed on a series of rollers which tend to maintain the circular shape of the cookies and to move the cookies to an open mesh belt on which the cookies are cooled.

In general, the description of the special knife or stripper blade assembly is as follows. It will be understood that the steel band on which the cookie material has been baked approaches the stripping point horizontally. Just before the stripping action is invoked, the band rides over a wheel having a diameter of several feet. After engaging the surface of the wheel for a short distance, the band moves slightly downward and at that point the stripping action takes place. The stripping blade is ⅝ inch wide by 45½ inches long and is mounted on a holding plate which has two angles, firstly, one extending downward 90° and secondly, downward from 45° to 90°. This serves to provide the proper contact between the stripping blade and the steel band and also to allow space for the first of a series of 10 transfer rollers. The first roller and the other nine rollers are at the same level as the stripping knife. The reason for the transfer rollers is that, as the hot cookie moves across the stripping knife, the transfer rollers being driven by 19 spur gears pull the cookie off the knife before the cookie next following has a chance to contact the preceding cookie by pushing it. The transfer rollers serve a convenient function by causing the cookie which has had its shape changed to be reshaped from egglike to round as the rollers pull it away from the knife. The transfer rollers are set in nine shaft collars and are separated from the nineteen spur gears by a seven inch long bracket.

The foregoing features are discussed in detail in the following specification and are claimed in the accompanying claims when considered with the drawings in which:

FIG. 1 is a plan view showing in plan view the relative position of the travelling belt on which the baking is performed, the position of the stripping blade with respect to the parallel rollers and the cooling belt;

FIG. 2 is a sectional view taken on the line 2—2 of FIG. 1;

FIG. 3 is a perspective view of the stripping blade and its supporting frame; and FIG. 4 is an elevational view transversely of the mounting for the parallel rollers, showing the adjustment means for the mounting.

Referring in detail to the several figures in the drawings, 1 is the steel band on which cookies are baked. 2 is the stripping blade and 3 is the frame on which the stripping blade is supported. The stripping blade 2 is shown in section and end view as illustrated in FIG. 2. The frame 3 has an upper horizontal portion extending toward the steel band 1. The frame 3 also has a portion which extends downward diagonally as indicated at 3$^a$ and which has a second horizontal portion 3$^b$ projecting in a direction away from said blade 2. A frame including plates 11 also has side plates 3$^c$ which extend vertically and which are secured to the frame 3 by bolts, shown in FIGS. 1 and 4, adapted to extend through openings 3$^d$ in the side plates 3$^c$.

The ten rollers 4 extend from one side of the machine to the opposite side and are parallel but spaced from each other. They are driven by a series of gears, not shown, so that all ten rollers rotate in the same direction. This arrangement serves to receive the cookies after being stripped from the steel band 1 and to advance the cookies to the endless woven steel mesh belt 5 on which the cookies are cooled. The belt 5 is mounted on and extends around a drum mounted on a shaft 6 which is turned by a chain 7.

Referring to FIG. 2, it will be understood that the steel band 1 approaches the stripping blade 2 from a horizontal position and as it approaches the blade 2 it rides over a drum or wheel designated by the legend "drum" in FIG. 2, having a diameter of a number of feet. In this arrangement the stripping blade 2 engages the steel band 1 as the band starts downward in its movement around the surface of the drum. In this travel, the blade 2 serves to lift the cookies from the surface of the steel band 1. The cookies are thus released to the upper surface of the nearest roller 4. The continuous rotation of the roller 4 progressively moves the cookies from roller to roller to the left, looking at FIGURE 2, and from the last one of the rollers 4 the cookies are passed to the endless belt of open mesh steel linkage so that air may pass through to help cool the cookies.

The ten rollers 4 and the frame 3 for the stripping blade are adjustable as a unit, as will be explained in the following.

The ten rollers 4 and the frame 3 are carried by a frame having upright plates 11 at opposite ends of the rollers 4 and knife 2. The ends of the rollers 4 project through the plates 11. The plates 11 are secured to and mounted on the frame 12 of the oven by angle brackets 13 and secured by adjustment screws 14 which determine relative height adjustment. The tilting of knife 2 is accomplished by rocking the plates 11 on a center bolt 15 after loosening locking bolts 16.

I claim:

1. In combination with an endless baking conveyor for supporting bakery products from the moment of application to the conveyor to completion of the cooking stage, a means for stripping the cooked product from the conveyor and holding the cooked product while being cooled comprising a knife extending transversely to said conveyor and in engagement with said conveyor surface, a series of driven rollers arranged in a row side by side and spaced from each other and extending parallel to said knife and adapted to receive and pass along bakery products stripped from said conveyor by said knife, and a section of metallic steel mesh in the form of a power driven endless belt lying next adjacent the last of said series of rollers to receive the bakery products and on which the said products are cooled, said belt having a width substantially the same as the length of said rollers and the mesh of said belt being sufficiently open to permit cooling air to pass therethrough.

2. In combination with an endless baking conveyor including a continuous metal belt for supporting bakery products from the moment of application to the conveyor to completion of the cooking stage, a means for stripping the cooked product from the metal belt and holding the cooked product while being cooled comprising a knife extending transversely to said metal belt and in engagement therewith, a series of driven rollers arranged in a row side by side and spaced from each other and extending parallel to said knife and adapted to receive and pass along bakery products stripped from said metal belt by said knife, means to rotate each of said rollers on its own axis, and a section of metallic steel mesh in the form of a power driven endless belt lying next adjacent the last of said series of rollers to receive the bakery products from said series of rollers, and on which the said products are cooled, said belt having a width substantially the same as the length of said rollers and the mesh of said belt being sufficiently open to permit cooling air to pass therethrough.

3. In combination with an endless baking conveyor including a continuous metal belt for supporting bakery products from the moment of application to the conveyor to completion of the cooking stage, a wheel for supprting said belt so that the belt passes downwardly from its initial contact with said wheel, said belt extending in a horizontal plane as it approaches said wheel and turning downwardly from the top of the wheel, a means for stripping the cooked product from the metal belt and holding the cooked product while being cooled comprising a scraper blade extending transversely to said metal belt and in engagement therewith, a series of driven rollers arranged in a row side by side and spaced from each other and extending parallel to said scraper blade and adapted to receive and pass along bakery products stripped from said metal belt by said scraper blade, means to rotate each of said rollers on its own axis, and a section of metallic steel mesh in the form of a power driven endless belt lying next adjacent the last of said series of rollers to receive the bakery products from said series of rollers and on which the said products are cooled, said belt having a width substantially the same as the length of said rollers and the mesh of said belt being sufficiently open to permit cooling air to pass therethrough.

4. In combination with an endless baking conveyor including a continuous metal belt for supporting bakery products from the moment of application to the conveyor to completion of the cooking stage, a wheel for supporting said belt so that the belt passes downwardly from its initial contact with said wheel, said belt extending in a horizontal plane as it approaches said wheel and turning downwardly from the top of the wheel, a means for stripping the cooked product from the metal belt and holding the cooked product while being cooled comprising a scraper blade extending transversely to said metal belt and in engagement therewith at a point adjacent that area at which said first belt leaves its horizontal position and turns downwardly, a series of driven rollers arranged in a row side by side and spaced from each other and extending parallel to said scraper blade and adapted to receive and pass along bakery products stripped from said metal belt by said scraper blade, means to rotate each of said rollers on its own axis, and a section of metallic steel mesh in the form of a power driven endless belt lying next adjacent the last of said series of rollers to receive the bakery products from said series of rollers and on which the said products are cooled, said belt having a width substantially the same as the length of said rollers and the mesh of said belt being sufficiently open to permit cooling air to pass therethrough.

5. In combination with an endless baking conveyor including a first continuous metal belt for supporting bakery products from the moment of application to the conveyor to completion of the cooking stage, a means for stripping the cooked product from the metal belt and holding the cooked product while being cooled comprising a scraper blade extending transversely to said metal belt and in engagement therewith, a series of driven rollers arranged in a row side by side and spaced from each other and extending parallel to said scraper blade and adapted to receive and pass along bakery products stripped from said metal belt by said scraper blade, means to rotate each of said rollers on its own axis, and a second power driven endless belt of metallic steel mesh lying next adjacent the last of said series of rollers to receive the bakery products from said series of rollers and on which the said products are cooled, said belt having a width substantially the same as the length of said rollers and the mesh of said second belt being sufficiently open to permit cooling air to pass therethrough.

6. In combination with an endless baking conveyor including a first continuous metal belt for supporting bakery products from the moment of application to the conveyor to completion of the cooking stage, a wheel for supporting said belt so that the belt passes downwardly from its initial contact with said wheel, said belt extending in a horizontal plane as it approaches said wheel and turning downwardly from the top of the wheel, a means for stripping the cooked product from the metal belt and holding the cooked product while being cooled comprising a scraper blade extending transversely to said metal belt and in engagement therewith at a point adjacent that area at which said first belt leaves its horizontal position and turns downwardly, a series of driven rollers arranged in a row side by side and spaced from each other and extending parallel to said scraper blade and adapted to receive and pass along bakery products stripped from metal belt by said scraper blade, means to rotate each of said rollers on its own axis, and a second power driven endless belt of metallic steel mesh lying next adjacent the last of said series of rollers to receive the bakery products from said series of rollers and on which the said products are cooled, said belt having a width substantially the same as the length of said rollers and the mesh of said second belt being sufficiently open to permit cooling air to pass therethrough, said rollers of said series lying in a plane adjustable with respect to said wheel.

7. In combination with an endless baking conveyor including a metal belt for supporting bakery products from the moment of application to the conveyor to completion of the cooking stage, a wheel for supporting said belt so that the belt passes downwardly from its initial contact with said wheel, said belt extending in a horizontal plane as it approaches said wheel and turning downwardly from the top of the wheel, and a means for stripping the cooked product from the metal belt comprising a scraper blade extending transversely to said metal belt and in engagement therewith at a point adjacent that area at which said belt leaves its horizontal position and turns downwardly, a series of driven rollers of the same cross sectional diameter arranged in a row side by side and spaced from each other and extending parallel to said scraper blade and adapted to receive and pass along bakery products stripped from said metal belt by said scraper blade, said rollers being mounted on a common frame adjustable with respect to said wheel, means to rotate each of said rollers on its own axis, said belt having a width substantially the same as the length of said rollers.

8. In combination with an endless baking conveyor including a first continuous metal belt for supporting bakery products from the moment of application to the conveyor to completion of the cooking stage, a wheel for supporting said belt so that the belt passes downwardly from its initial contact with said wheel, said belt extending in a horizontal plane as it approaches said wheel and turning downwardly from the top of the wheel, a means for stripping the cooked product from the metal belt and holding the cooked product while being cooled comprising a scraper blade extending transversely to said metal belt and in engagement therewith at a point adjacent that area at which said belt leaves its horizontal position and turns downwardly, a series of driven rollers arranged in a row side by side and spaced from each other and extending parallel to said scraper blade and adapted to receive and pass along bakery products stripped from said metal belt by said scraper blade, means to rotate each of said rollers on its own axis, and a second power driven endless belt of metallic steel mesh lying next adjacent the last of said series of rollers to receive the bakery products from said series of rollers and on which the said products are cooled, said belts having a width substantially the same as the length of said rollers and the mesh of said second belt being sufficiently open to permit cooling air to pass therethrough, a common frame for supporting said rollers and said scraper blade, and means to regulate the inclination of said common frame with respect to said metal belt to bring the scraper blade into the best position for removal of cookies from the metal belt.

9. In combination with an endless baking conveyor including a metal belt for supporting bakery products from the moment of application to the conveyor to completion of the cooking stage, a wheel for supporting said belt so that the belt passes downwardly from its initial contact with said wheel, said belt extending in a horizontal plane as it approaches said wheel and turning downwardly from the top of the wheel, and a means for stripping the cooked product from the metal belt comprising a scraper blade extending transversely to said metal belt and in engagement therewith at a point adjacent that area at which said belt leaves its horizontal position and turns downwardly, a common frame for supporting said rollers and said scraper blade, and means to regulate the inclination of said common frame with respect to said metal belt to bring the scraper blade into the best position for removal of cookies from the metal belt.

10. In combination with an endless baking conveyor including a metal belt for supporting bakery products from the moment of application to the conveyor to completion of the cooking stage, a wheel for supporting said belt so that the belt passes downwardly from its initial contact with said wheel, said belt extending in a horizontal plane as it approaches said wheel and turning downwardly from the top of the wheel, and a means for stripping the cooked product from the metal belt comprising a scraper blade extending transversely to said metal belt and in engagement therewith at a point adjacent that area at which said belt leaves its horizontal position and turns downwardly, a series of driven rollers arranged in a row side by side and spaced from each other and extending parallel to said scraper blade and adapted to receive and pass along bakery products stripped from said metal belt by said scraper blade, means to rotate each of said rollers on its own axis, said belt having a width substantially the same as the length of said rollers, a common frame for supporting said rollers and said scraper blade, and means to regulate the inclination of said common frame with respect to said metal belt to bring the scraper blade into the best position for removal of cookies from the metal belt.

References Cited
UNITED STATES PATENTS

| | | | |
|---|---|---|---|
| 1,832,374 | 11/1931 | Forby et al. | 107—4 |
| 2,576,633 | 11/1951 | Naylor | 15—256 |
| 2,717,560 | 9/1955 | Kottmann | 107—4 |

FOREIGN PATENTS 1,379,155   10/1964   France.

WALTER A. SCHEEL, *Primary Examiner.*

J. SHEA, *Assistant Examiner.*